United States Patent
Hunter et al.

(10) Patent No.: US 6,363,422 B1
(45) Date of Patent: Mar. 26, 2002

(54) MULTI-CAPABILITY FACILITIES MONITORING AND CONTROL INTRANET FOR FACILITIES MANAGEMENT SYSTEM

(76) Inventors: Robert R. Hunter, 326 Fontaine Dr., Danville, CA (US) 94506; David A. Vogt, 15112 Shining Star La., San Leandro, CA (US) 94579; Leslie Cheong, 1236 Emory St., San Jose, CA (US) 95126

( * ) Notice: Subject to any disclaimer, the term of this patent is extended or adjusted under 35 U.S.C. 154(b) by 0 days.

(21) Appl. No.: 09/104,039

(22) Filed: Jun. 24, 1998

(51) Int. Cl.[7] .................. G06F 15/173; G06F 15/16
(52) U.S. Cl. .................. 709/224; 709/218; 709/318
(58) Field of Search .................. 709/208, 217, 709/218, 220, 224, 250, 317, 318

(56) References Cited

U.S. PATENT DOCUMENTS

| | | |
|---|---|---|
| 4,747,041 A | 5/1988 | Engel et al. |
| 4,939,728 A | 7/1990 | Markkula, Jr. et al. |
| 5,086,385 A * | 2/1992 | Launey et al. .............. 364/188 |
| 5,333,183 A * | 7/1994 | Herbert .................... 379/112 |
| 5,446,677 A | 8/1995 | Jensen et al. |
| 5,511,188 A | 4/1996 | Pascucci et al. |
| 5,522,044 A | 5/1996 | Pascucci et al. |
| 5,550,988 A | 8/1996 | Sarangdhar et al. |
| 5,553,609 A * | 9/1996 | Chen et al. ................ 128/630 |
| 5,555,195 A | 9/1996 | Jensen et al. |
| 5,572,438 A | 11/1996 | Ehlers et al. |
| 5,678,042 A * | 10/1997 | Pisello et al. .............. 714/47 |
| 5,684,826 A | 11/1997 | Ratner |
| 5,742,762 A * | 4/1998 | Scholl et al. .............. 709/200 |
| 5,804,802 A * | 9/1998 | Card et al. ................ 235/375 |
| 5,913,036 A * | 6/1999 | Brownmiller et al. . 340/825.06 |
| 5,924,486 A * | 7/1999 | Ehlers et al. .............. 165/238 |
| 5,968,176 A * | 10/1999 | Nessett et al. ............. 713/201 |
| 6,012,152 A * | 1/2000 | Douik et al. ................ 714/26 |

OTHER PUBLICATIONS

Shim, Y.C. et al., "Monitoring and control of distributed systems", IEEE Conf. on Systems Intergration, pp. 672–681, Apr. 1990.*

Blissett, R.J. et al., "New techinques for digital CCTV provessing in automatic monitoring", IEEE Conf. on Vehicle Navigation, pp. 137–140, Oct. 1993.*

Dekhil, M. et al., "Commanding sensors and controlling indoor autonomous robots", IEEE Conf. on Control Applications, pp. 199–204, Sep. 1996.*

* cited by examiner

*Primary Examiner*—Zarni Maung
*Assistant Examiner*—Jason D. Cardone
(74) *Attorney, Agent, or Firm*—Gray Cary Ware & Freidenrich LLP

(57) ABSTRACT

One or more client devices are coupled to a system server through a network link, with the network adapted to support TCP/IP packet-based data transmission protocols. The system server provides initial set-up parameters and continuing operating instructions to each client device over the network link. Subsequently, client devices carry out normal monitoring functions locally, over their local communication link. Intervention by the system server is no longer required unless and until a client device determines that one of its supported pieces of infrastructure equipment is functioning outside of its normal operating parameters. The System server gives the appropriate control information to the client which communicates the control code to the out-of-parameter device in its native language protocol.

22 Claims, 7 Drawing Sheets

MULTI-CAPABILITY FACILITIES MONITORING AND CONTROL INTRANET FOR FACILITIES MANAGEMENT SYSTEM

FIELD OF THE INVENTION

This invention generally relates to facilities management systems and more particularly to an integrated and networked system for facilities management systems which is remotely operable through Internet protocols.

BACKGROUND OF THE INVENTION

Buildings, campuses, multi-location environments, and other types of facilities commonly use monitoring and control systems to manage the operational disciplines of environmental systems, electrical and power distribution systems, security systems, and health/safety and fire protection systems.

Pertinent to an understanding of facilities management systems, is the understanding that there are many commercially available products which are able to provide sensing and control functions necessary for effective facilities management. These products generally range from very expensive, elaborate systems, to rather simple systems having relatively low intelligence. Originally, facilities management systems depended on linking remote pieces of facilities equipment to a centrally located command and control console by dedicated serial cabling or some other non-network connection. Defining a facilities management architecture in terms of dedicated cabling suffers from a number of logical flaws and disadvantages.

In particular, geographically diverse or remote facilities, even those located on a common campus, could not be managed effectively because of the difficulty attendant to making robust connections between and among facilities equipment and between the facilities equipment and a client/server system over geographical distances in excess of 30 meters. Moreover, managing even the facilities equipment disposed throughout a single facility from a remote central management console is highly disadvantageous in that such remote management contemplates a dial-up connection made between the central console and a supported piece of equipment in order to effect the management and control function. Such dial-up connections are slow, have limited functionality and exhibit poor control response because of the inherent time-lapse attendant between an event requiring remediation and the appropriate response.

In addition to the difficulties attendant to non-network interconnects, facilities equipment manufactured by different vendors could not be linked together in a single communication structure because each brand of equipment typically employed a different transmission protocol and/or proprietary communication connection from other brands. Thus, an HVAC installation by Johnson Controls Company would be unable to be coupled to the same communication structure as an HVAC installation from Liebert Corporation.

Notwithstanding the difficulties inherent in attempting to link together multi-vendor equipment into a facility, significant difficulties are encountered when attempting to link together equipment designed to accommodate different disciplines, even though manufactured by the same vendor. Linking different types of equipment together is often impossible due to the inherently different nature of the tasks undertaken by devices designed for the environmental, electrical, security and fire protection disciplines. Such multi-task linking often precluded an effective facilities communication structure even when multivendor and multi-location issues were avoided.

Several attempts have been made in the prior art to improve communications with any facilities management system by devising various means for linking together different brands of equipment in a multi-vendor architecture. The primary focus of these prior art attempts was to create a common data transmission protocol and communication interconnect adaptable for use within a single facility. It was thus thought that many vendors would adopt such a protocol by allowing them to maintain their proprietary control code structure, but allow the common protocol to transmit all code information to a central point for management.

U.S. Pat. No. 4,939,728, owned by Echelon Systems Corp., describes a local area network (LAN) capable of communicating information through the existing power wiring of a single facility, given that the facility falls within certain size parameters and limitations. Data communication is effected through a standard protocol to transmit data to a central console, and, to the extent that the standard protocol was hosted by all of the brands of equipment comprising the facility, more than one type of equipment from more than one manufacturer could be managed through the central console. In practice, however, the common transmission protocol was provided without defining a common central management interface. Few manufacturers would acquiesce to the control rules for their equipment being devised and defined in accordance with another manufacturer's desires. In addition, though able to provide a rudimentary degree of multi-task and multi-vendor management, the '728 system was not able to manage geographically diverse or remote facilities, even those located on a common campus, because of the requirement that information be communicated through an existing power line network.

A further prior art attempt at multi-task and multi-vendor facilities management was described in U.S. Pat. No. 5,684,826, owned by Acex, which provided an RS-485 serial communication modem which converts data for transmission over a power line network. Because a number of existing facilities products use RS-485 communication protocols, certain manufacturers were able to keep their existing code and protocol and capture the ability to transmit data in a LAN environment within a single facility. Although this prior art approach offers a rudimentary multi-task and multi-vendor capability with regard to equipment hosting the RS-485 communications protocol, it is disadvantageous in that while some facilities devices use RS-485 communications, a majority do not. Indeed, the most common form of communication for such equipment remains RS-232 or contact closure. Moreover, power line network communications are limited to use within a single facility and, thus, do not address the multi-site or multi-location issue.

Various other systems and networks have been devised in the prior art in an attempt to devise a facilities management system that was able to simultaneously deal with multi-task, multi-vendor, multi-location and remote management issues posed by modern infrastructure facilities. None of these prior art systems have exhibited the degree of flexibility necessary to offer monitoring and control of all multi-task disciplines of facilities management including environmental, electrical, security, power and fire protection systems. While also providing multi-vendor, multi-site and remote management capabilities, all in a standards-based network. Accordingly there is a need for a facilities management system which is able to provide a means of communicating with any type or brand facilities equipment which supports some degree of input/output (I/O) based communication by establishing a direct communication channel to that device through a variety of standard communication protocols. Such a system should provide a means for monitoring and controlling any supported equipment by storing and communicating all of the operating rules necessary to manage that particular piece of facilities equipment and also to provide a means for bi-directionally communicating information between a particular piece of facilities equipment and a central server, regardless of the geographic location of the device or the server over a standard voice or data communications network. Such a system should further provide a means to configure, reconfigure and manage a client object in direction communication with supported devices, which is linked to the server through the standard voice or data communications network as well as a means to manage a server and all of its linked clients from a remote connection through the standard voice or data communications network.

SUMMARY OF THE INVENTION

These and other objects and advantages of the present invention are realized in a facilities management intranet that can be used to easily and flexibly monitor and control facilities equipment both within a single facility and within multiple facilities, without regard to the facility's size or its physical location and irrespective of the location of a system user. In addition, the facilities management intranet in accordance with the invention notifies a system user of any alert or alarm condition developed by any facility in any location, irrespective of the individual user's physical location. Thus, the present invention provides a standards-based cohesive system for monitoring and controlling any number of facilities and their included equipment from any local or remote location.

In one aspect of the invention, a means of monitoring and controlling facilities equipment is accomplished by coupling facilities equipment, irrespective of either task or vendor, to a management intranet comprising intranet clients, which communicate directly with each piece of facilities management equipment, and an intranet server, which communicates exclusively with the intranet clients. The facilities-type infrastructure devices are multi-task devices in that they may be selected from the group consisting of power distribution equipment, environmental control equipment, security monitoring equipment and health/safety and fire equipment. Each infrastructure device is capable of generating and receiving I/O information over its vendor defined communication interface which might be an RS-232, RS-422, RS-485 or contact closure harnessing interface. I/O information is communicated between infrastructure devices and a client device in accordance with the infrastructure device's vendor defined native language protocol.

One or more intranet clients, which gather monitoring information from and send control information to facilities equipment through said equipment's I/O ports may be disposed either within each piece of facilities equipment or, alternatively, might be disposed in a hardware configuration separate from each piece of facilities equipment. Once configured by an intranet server, the client performs all management tasks locally and contains all instructions necessary to monitor and control each piece of facilities equipment coupled thereto.

An intranet server provides initial setup parameters and instructions to each client device, as well as performs central alarm and viewing management functions for all of the intranet clients. The server may be disposed at any location to which all of the client devices have communication access via Internet Protocol (IP) packet-based communications. The server is coupled to each of the client devices by a network communication link which supports IP packet-based communications.

In particular, a facilities monitoring and control intranet comprises one or more client devices in communication with a server. Each client device also communicates with one or more pieces of facilities infrastructure equipment through its native communications protocol. The clients are each in communication with the server using an Internet Protocol (IP) packet-based communications link. All rules for controlling each piece of facilities equipment are provided by the server to each client device, when requested. All rules for monitoring each piece of facilities equipment are programmed to, and remain resident and operational on, each client. System users may dispose clients in any manner so as to promote equipment management in any geographic location, so long as the client device has access to a voice or data connection that supports Internet Protocol (IP) packet-based communications. System users are able to connect to the server in order to view or manage server operations, individual clients and/or their supported infrastructure equipment through a common browser application or a web-enabled spreadsheet via a voice or data connection that supports IP packet-based communications.

BRIEF DESCRIPTION OF THE DRAWINGS

These and other particular features, aspects and advantages of the present invention will be more fully understood when considered with respect to the following detailed description, appended claims and accompanying drawings, wherein:

DETAILED DESCRIPTION OF THE INVENTION

Figure 1:
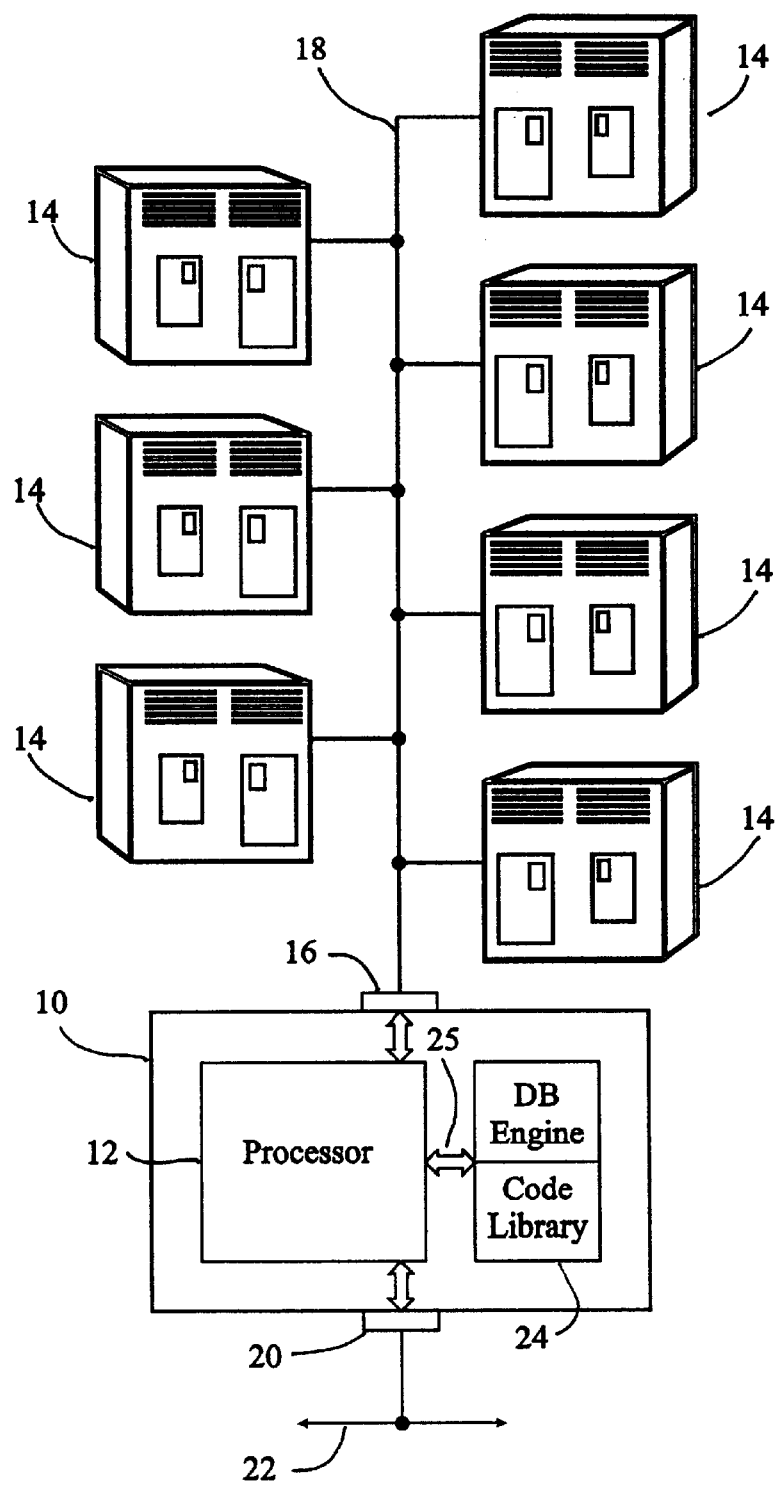
FIG. 1 is a semi-schematic block diagram of an exemplary client system coupled to a number of facilities devices over a serial communication link according to the principles of the present invention.

In accordance with practice of principles of the present invention, an IP standards-based multifaceted monitoring and control intranet is operative to manage and control multi-task apparatus configured to carry out the common tasks and disciplines of contemporary facilities management, such as environmental control, electrical power management, security and health/safety and fire protection systems. The system provides support for multivendor facilities architectures and is able to control any piece of supported apparatus by hosting, storing and communicating all operating rules and protocols necessary to communicate with and manage any particular piece of facilities equipment. The system is further able to support multi-site facilitizations and is able to bi-directionally communicate with and remotely manage any particular piece of facilities apparatus, regardless of the physical location of the apparatus, the system structural components, and the monitoring and control system user.

Briefly, the system according to the invention is implemented in a client/server configuration architecture, with the client responsible for direct communication with particular pieces of infrastructure equipment, in its native language protocol, so as to gather apparatus specific monitoring information, and with the server responsible for analyzing system variable response metrics and adaptively providing control responses thereto. The client/server architecture configuration is non-specific, in that it may be implemented in a number of configuration choices, each with various independent and unique features. In particular, and as will be described in detail below, the system may be configured as a stand-alone network installation, with a server defining terminal access to a number of client applications, each capable of communicating with a plurality of infrastructure apparatus, through a dedicated network architecture, such as a dedicated HUB. An integrated network installation allows the system to be integrated into an existing network architecture, such as an enterprise-wide, or facility-wide data or telecommunications backbone structure, with the server and client applications merely coupled into the network at the nearest network port, backbone block, connector interface, and the like. In this case, the existing enterprise-wide network infrastructure functions as the communication backbone for the client/server system of the present invention.

A third network installation, contemplated for use in connection with the invention, is a hybrid, effectively concatenated, architecture, in which a multiplicity of stand-alone installations each have server applications coupled to an enterprise-wide network through a network or telecommunications gateway. Thus, it will be understood that the particular systems and architectures comprising the present invention are adaptively configureable in a number of combinations, and are not to be limited to the specific embodiments and arrangements illustrated and described. Indeed, a primary feature of the system in accord with the invention is its flexibility and the ease with which it may be rearranged and reconfigured to accommodate an expanding facility, the addition of multiple new sites, the combination of single-space facilities such as private homes or individual office buildings, high-rise and campus environments, and the like.

Operationally, each client system, in accord with the invention, is able to monitor and control one, or more, pieces of infrastructure equipment. The infrastructure equipment may either host the client as part of its operational processor as a software application, host the client on a direct internal bus as a hardware application, or be coupled to an externally disposed client by an external bus, such as a serial interface cable or other suitable communication interface bus. As will be described further below, the specific parameters of the physical serial, or other, interface may vary and will depend on the specific communication interface chosen for a particular piece of equipment by the equipment vendor or manufacturer. The interfaces most commonly provided by infrastructure equipment manufactures are serial interfaces such as RS-232, RS-422, RS-485, other interface busses such as MODBUS, J-BUS and CEbus, or might even be a serial wire contact closure harness if the infrastructure apparatus was not designed with the capability of supporting more sophisticated communication protocols.

Regardless of the nature of the communication interface between the client and its supported equipment, the client communicates with each apparatus using its vendor specified native language protocol, and is capable of interrogating each apparatus and receiving a set of monitoring variables in response. Such monitoring variables might be, for example, a measured temperature, a measured line voltage or current, a line pressure state for a leak detection system, and the like. Because the client is able to communicate with each apparatus in its native language protocol, it need not engage in substantial translation activities.

In addition, when prompted to do so by the server, the client is able to pass appropriate control variables to its supported equipment, thereby commanding each apparatus to perform a particular function, such as setting a thermostat to a particular temperature, turning on (or off) an HVAC apparatus, cascading through a set of security cameras, raising (or lowering) ambient light levels, and the like. All of the rules, termed vendor specific control codes (or control codes), for managing any particular piece of facilities equipment, are resident in the client system and are used by the client to monitor and control each of its supported pieces of apparatus. The choice of which particular control code to issue to a piece of supported equipment is determined by the system server and communicated to the client over the client's network link.

At system power-up, an initialization or configuration procedure is invoked, in which the client systems inform the system server of the "identity" of each piece of supported equipment, thus prompting the server system as to which set of control command protocol codes to use in communicating with the clients and their appropriate devices. Once initialized or configured, each client is able to perform all routine management tasks locally; interrupting the server only for exceptions, or during periodic data dumps made at the request of a system user.

A facilities monitoring and control intranet comprises at least one client system coupled to a server over a network connection capable of supporting Internet Protocol (IP or TCP/IP) packet-based data transmission. The intranet server provides the initial monitoring and set-up parameters and operating control instructions to each client, and further functions as a management center which processes monitored system data received from its clients, centrally manages alarm and notification functions and provides a central viewing management platform. All monitoring and control of supported devices is performed by the client system over a machine supported serial link using the machine's native language protocols, while all communication between the client device and the system server is performed over a network link, thus minimizing network bandwidth utilization.

Turning now to FIG. 1, there is depicted a semi-schematic block diagram of an exemplary client device, suitable for use in practice of the present invention, and configured to communicate with a multiplicity of individual pieces of facility infrastructure apparatus. While characterized, in terms of the overall system architecture, as a client device, it will be understood from the exemplary embodiment of FIG. 1, that the client system 10 may itself be viewed as performing certain of the functions generally pertinent to a server, i.e., it might be characterized as a serial-type server configured to monitor and control particular pieces of infrastructure apparatus.

The exemplary client device 10 is depicted as a computer controlled hardware architecture, suitably comprising a microprocessor 12 operating under software program control to bi-directionally communicate with one or more pieces of infrastructure equipment, indicated generally at 14. Microprocessor 12 can be implemented as any one of a variety of integrated circuit microprocessors or controllers capable of executing program instruction steps under the direction of an applications software program. Microprocessor 12 is suitably implemented as a 16-bit, a 32-bit, a 64-bit, or greater, microprocessor, and preferably as a 32-bit, or greater microprocessor. Those having skill in the art will immediately recognize that there are several microprocessors suitable for use in connection with the present invention. Non-limiting examples of such suitable microprocessors are those manufactured and sold by Intel, Advanced Micro Devices, Cyrix, Motorola and equivalents.

The client system 10 further comprises a serial input/output (I/O) port 16, coupled to the microprocessor 12 through which the microprocessor 12 is able to communicate with the infrastructure apparatus 14. Pertinent to the construction of the client system 10, is that the serial port 16 may be optionally configured as an RS-232 port, an RS-422 port or an RS-485 port interfacing with a serial interconnect bus 18 through a DB-25, DB-9, RJ-45, or equivalent-style serial connector. Alternatively, the serial port 16 may be configured to bi-directionally communicate information in accordance with conventional contact closure protocols. It should be noted that the configuration of the serial port 16 will necessarily depend on the configuration of the serial communication interface designed into each of the infrastructure apparatus 14 intended to be connected thereto by means of the serial bus 18. Appropriate modifications to the configuration of the serial port 16 may be easily accomplished by one having skill in the art, once the vendor specified serial communication protocol of the infrastructure apparatus is known.

In other words, the port 16 can be understood as a "plug replaceable", "black box" element. In terms of the invention, it is expressly intended that the port 16 is to be considered a functional element rather than being defined as a particular structural implementation. If, for example, it becomes desirable to adapt IP-based communication capabilities to future infrastructure devices, the port 16 is easily adaptable to conform to that communication protocol. Likewise, neither the port 16, nor the communication bus 18 are required to communicate data in serial fashion. Those having skill in the art will immediately understand that reconfiguring both the port and the bus to facilitate parallel data communication, involves little more than substituting parallel interface circuitry and parallel cabling for their serial equivalents. This is particularly relevant in the case where the client is directly hosted within an infrastructure device, and communicates with device specific circuitry over an internal bus. The same logic holds true for client/device communication over a high speed optical interface, a wireless (RF or IR) interface, and the like. All that is required for practice of the invention, is that the client 10 comprise an infrastructure apparatus side I/O interface, and that the interface be suitable for mating with an equivalent interface provided in, or on, a piece of infrastructure apparatus. However, to promote clarity and without limitation, the infrastructure device and client communication I/O ports and the interconnect bus will continue to be referred to as serial ports and a serial bus.

In addition to bi-directionally communicating through serial port 16, the client system 10 further comprises a network input/output (I/O) port 20 adapted for bi-directional communication between the microprocessor 12 and an external, bi-directional communications network 22. In accordance with the invention, the network port 20 preferably comprises 1 Mbps, 10 Mbps or 100 Mbps Ethernet interface adapter circuitry coupled to the network 22 through a 1/10/100 BASE-T I/O and an RJ-45 coax connector. Although the network port 20 is described in the illustrated embodiment of FIG. 1. as comprising an Ethernet interface, it will be immediately recognized by those having skill in the art that the network port 20 might be configured to provide access to any one of a number of conventionally recognized local or wide-area-network (LAN/WAN) array configurations. In addition, the network port 20 might be configured to support certain arbitrated loop serial protocols such as FCAL, or any other of a variety of conventional client-server interconnect topologies.

Indeed, the system according to the present invention only contemplates a digital network connection capable of supporting Internet Protocol transmission. Subscriber Line Telephone Connection in combination with a modem, a token passing network architecture such as Token Ring, FDD1, Frame Relay, ISDN, bundled ISDN, X-25, DSL, CDPD, Switched Circuit Cellular, Internet Cable TV Provider, Satellite Networks, various Fibre-Channel optical and copper wire arbitrated loop architectures, and any other wireless or wireline based architectures are all networks suitable for use by the present invention so long as they are capable of supporting IP or TCP/IP packet-based transmissions.

Preferably, the network port 20 is configured as an Ethernet port because of the pervasive nature of Ethernet availability as a corporate networking architecture. Further, using Ethernet cabling as a backbone allows maximum flexibility for the novel system inasmuch as Ethernet cabling provides a number of significant advantages over existing alternative serial wiring implementations. In particular, Ethernet cabling allows the client system 10 to be disposed at an effectively unlimited distance from other client systems and from a control source, such as a server application or a central database unit. In addition, data transmission between a server or central database unit and the client system 10 are functionally robust and highly reliable because of the error recovery mechanisms inherent in IP packet-based communications as used in Ethernet Networks.

On the serial I/O side, as was mentioned above, the client system 10 communicates with various pieces of infrastructure apparatus 14 over a serial communication bus 18. In accordance with the invention, the client system 10 communicates directly with the serial port using the infrastructure equipment's native language protocols or, if the apparatus functions with regard to dry contact switching only, the client system 10 communicates directly with the infrastructure equipment's contact point.

Pertinent to an appreciation of the operation of the novel system is an understanding of the forms and types of facilities equipment that might be monitored and controlled thereby and the details of their configuration, operation and control response variables. For example, the infrastructure apparatus 14 of FIG. 1 might belong to any one of four main categories of facilities management equipment; namely, power supply and distribution equipment, environmental control equipment, health/safety/fire monitoring equipment and security monitoring equipment.

Power supply and distribution equipment typically includes utility power monitoring equipment that measures power line state with current and voltage transducers disposed along distributed lines, utility metering equipment that measure the quantity of power used, power distribution units (PDU's) that distribute line power to a local environment, uninterruptable power supplies (UPS's) that supply instantaneous power in the event of a line interruption, generators that provide long term power in the event of a line interruption, or a local set of equipment and switch gear systems that supply and distribute power from a main transmission or reception point. These types of power facilities typically provide information as to system state over RS-232, RS-422 or RS-485 serial interfaces, MODBUS, J-BUS, CEbus busses, or in certain cases, via contact closure. Likewise, uninterruptable power supplies (UPS's), which supply battery backup during power failures and generator systems that supply longer-term power backup provide information typically over an RS-232 serial interface but may also provide such information via RS-485 or contact closure means.

Environmental control equipment typically comprises heat, vent, air conditioning and refrigeration units (HVACR), leak detection systems for detecting fluid leaks in certain buildings as well as underground storage tanks, and heating systems that supply heat to a process pipe for hotel hot water systems, chemical plants, pipelines, and the like. As was the case with power facilities equipment, environmental equipment typically provides information over RS-232, RS-422 or RS-485 serial, or MODBUS, J-BUS or CEbus interfaces, depending on the vendor. System state information is also available in contact closure form.

Health/safety/fire monitoring equipment are typically installed in panel form which monitor the status of smoke, heat, fire or distress sensors in any given facility. System state information is typically available over an RS-232 or RS-485 interface. Certain equipment manufacturers also configure their equipment to provide information over MODBUS, J-BUS and Cebus interfaces. A parallel port feed is also a common means of developing information from health/safety/fire monitoring equipment as well as contact closure. Again, the system state information interface is dependent on the choice of vendor.

Security systems include closed contact alarm sensors, motion sensors, and the like, and may also include closed circuit video monitoring systems and web-based cameras. Sensor based information is conventionally available over MODBUS, J-BUS and CEbus interface busses, and very commonly over RS-232, RS-422 and RS-485 serial interfaces, while video graphic information from security cameras must be processed by some form of video compression, prior to transmission, and are conventionally available as JPEG compressed video images. It should be noted that video camera based security systems are constantly increasing their capabilities, such that a monitoring and control system must be able to deal with NTSC standard full-color full-motion video signals as well as black and white, still photo and moving photo systems. Even when such systems incorporate enhanced compression algorithms, such as MPEG-2, wavelets, and the like, it will be understood by those having skill in the art, that bandwidth utilization will play an increasingly crucial role in defining system capabilities.

Notwithstanding to which category of facilities management equipment a particular piece of infrastructure apparatus belongs, or which serial communication interface has been chosen for implementation by the vendor, each piece of infrastructure equipment is able to communicate with a client device and a management server by sending system state information, in a pre-determined form and format, to its serial communication interface port, and by receiving control commands, in the same pre-determined form and format, from the client device. The meaning of each control code, and the actions to be taken by a particular piece of facilities equipment in response thereto, are defined by each individual vendor or manufacturer and are conventionally termed vendor codes. The physical form of vendor codes are not especially relevant to practice of the invention, and need not be described in detail herein. It is sufficient to mention that vendor codes may be expressed in a variety of forms including ASCII character codes, vendor defined binary or hexadecimal codes, "C" codes, "C+" codes, "C++" codes, JAVA codes, and the like. Any digital signal convention will serve.

Vendor codes provide monitoring information about and control information to, a particular piece of equipment. Vendor control codes command a piece of equipment to take a certain required action on the basis of monitoring response variables passed by the machine to the client device, and thence to the management server. The combination of vendor codes directed to a particular apparatus and the system response variables returned by the apparatus are often referred to as that apparatus' native language protocol. Equipment manufacturers and vendors each typically define their own native language protocols. Accordingly, in order to be able to communicate with a wide variety of equipment, some means must be provided so that the system of the present invention is able to communicate with all types of infrastructure equipment in accordance with their native language protocols.

Returning now to FIG. 1, individual vendors' infrastructure equipment native language protocols are hosted and stored in a non-volatile memory storage unit 24 which is coupled to bi-directionally communicate with the client system microprocessor unit 12 via an internal bus 25. A particular advantage to configuring the memory storage unit 24 as a non-volatile memory is to allow the client systems operating program, hosted thereon, to boot-up without requiring intervention of a network host load procedure and to allow the system to retain historical response variable information in the event of a power loss or when the system is powered-down. The memory storage unit 24 may be any storage device including, but not limited to, a rotating media mass storage device (disk drive), a RAM, ROM, tape drive, or any other device commonly used for storing information. Preferably, the non-volatile memory 24 is a programmable memory such as an EPROM, EEPROM or FLASH memory. However, all that is required is that the memory storage area 24 be non-volatile in order to retain data in the absence of a power supply signal, and that it be programmable in order to support quick addition of vendor protocol codes in a manner to be described in greater detail below.

Although described in terms of its hardware structural components, the client system 10 can also be characterized as an application program which is hosted and supported by the hardware system of FIG. 1. In one particular embodiment, the application program comprises highly portable code written in the "C" high-level programming language. This is to allow the "client" application of the present invention to be hosted on any number of different systems, including a hardware implementation configured into a piece of infrastructure, itself.

The application program is further subdivided, or compartmentalized, into two functional sections, an operating section, also termed the "database engine", comprising the files and program instruction steps necessary for the system to carry out its primary function of communicating with, and storing data about, the supported devices, and a library section comprising a library of vendor specific equipment protocol codes which can be accessed by the operating section or database engine in order that the client system 10 is able to communicate with specific pieces of infrastructure equipment 14 in each device's native language protocol. The vendor code library may, thus, be viewed as a set of translation filters comprising entries for each of the types of apparatus contemplated for use in connection with the client system 10. Providing the library code section in a form separate from the operating section of the program, allows vendor protocol codes to be defined and stored in a number of forms and formats, each of which is specific to a particular vendor's brand of equipment. In addition, separating the code library from the database engine portion allows additional codes to be seamlessly incorporated into the client system's capabilities, as new or different facilities devices are added to the system.

Identifying which protocol code is applicable to any piece of equipment coupled to the client system 10 involves merely defining a particular vendor's entry variables in the operating code. When instructed by the server, for example, to cause a device to execute a particular instruction, the client database engine accesses the appropriate memory location containing that entry and uses that entry as a code filter through which the operating section communicates with the desired piece of infrastructure equipment 14.

For example, in a typical HVAC installation, the temperature and humidity control functions might be set to turn on a fan, if the measured temperature is determined to exceed 80 degrees. The client system is able to poll the serial link, in a manner to be described below, and gather temperature measurements as a monitoring response variable from the HVAC equipment. If the measured temperature is reported as 81 degrees, the database engine determines that the operating parameters of the device have been exceeded, and so informs the server. In accord with its programming, the server decides what action is to be taken in response to the violation (i.e., turn on a fan) and so informs the client over the network link, in effect, instructing the client to issue a particular control code to the device which will cause the device to take the commanded action (i.e., fan is turned on). The client database engine then accesses the vendor code library portion appropriate to that piece of equipment, and retrieves the specific control code with which to command the fan to turn on. The control code is communicated to the device in its native language protocol, and the fan is activated.

In summary, the client system 10 is put in to reasonable proximity with a specific piece or pieces of infrastructure apparatus with which the client system is intended to communicate, monitor and control. Next, a communication link is established between the client system 10 and the infrastructure equipment 14, the configuration of which is defined by the I/O capabilities of the infrastructure apparatus. Each piece of equipment to be managed by the client, is identified to the client system 10, so that its application program can access the vendor code library and extract the appropriate vendor specific protocol codes such that the client system is able to communicate with each piece of infrastructure equipment in its native language.

A communication link is established between each client system 10 and a system server through each client system's network I/O port (Ethernet port). The process repeats for each client system that is to be added to any particular facilities management intranet, with each client system informing the server of its location and the characteristics of each piece of infrastructure apparatus that it will manage. In accordance with the present invention, the server hosts an application program which is able to analyze all of the system monitoring exception response variables passed to the server system by each client system's connected infrastructure equipment and is further able to communicate all of the necessary and appropriate information to each corresponding client system for each client system to properly monitor and control its designated infrastructure equipment.

Figure 2:
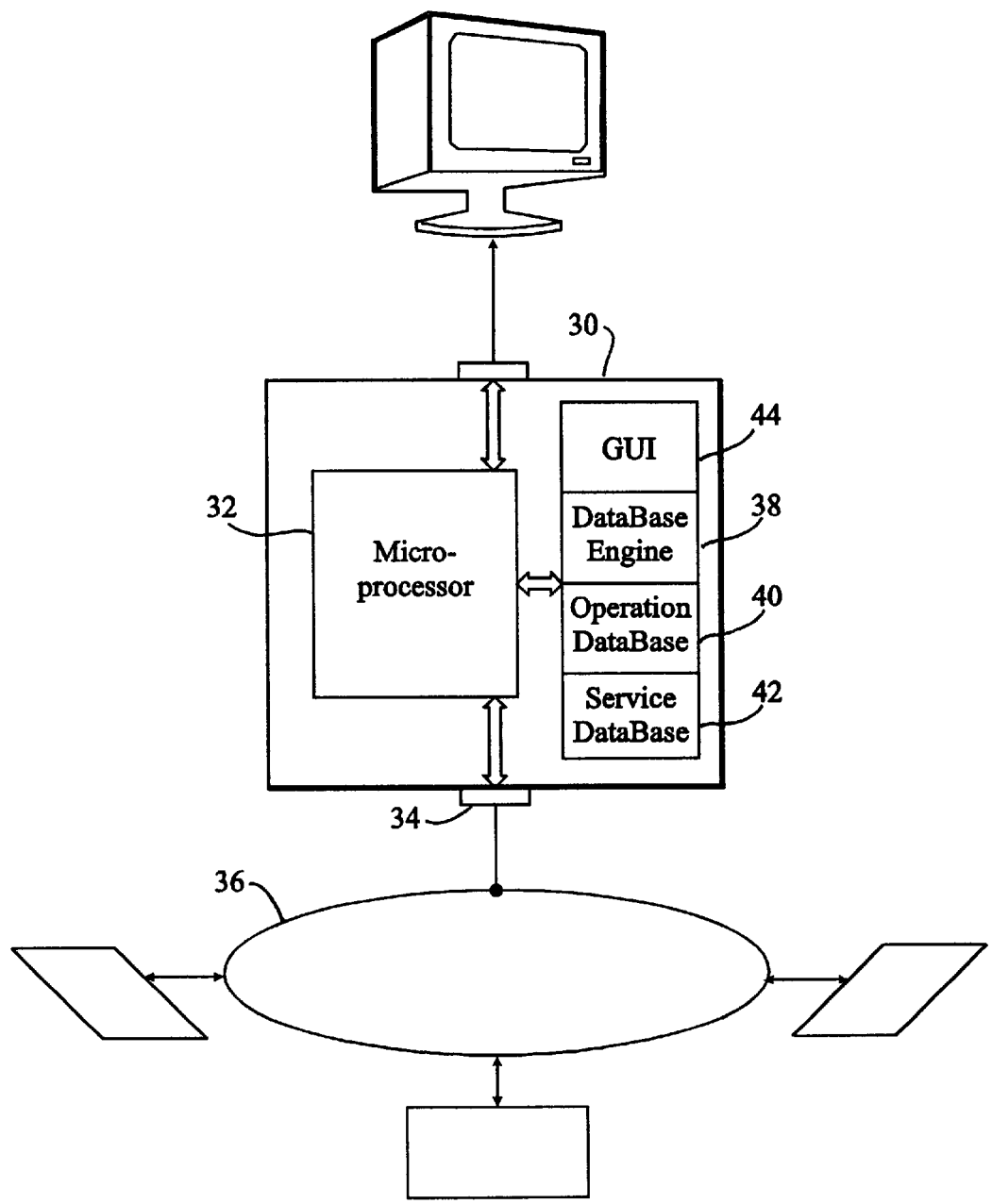
FIG. 2 is a semi-schematic block diagram of an exemplary server coupled to an exemplary client device over a network communication link in accord with the present invention.

FIG. 2 illustrates an exemplary system network server 30 suitable for practice of principles of the invention. As was the case with the client system, the exemplary server 30 can be implemented in many different hardware configurations, but is preferably configured as a standard personal computer. The server 30 might be an IBM-compatible PC-type computer, an Apple-type computer or might be configured as a workstation. Configured as a standard IBM-compatible personal computer, the server 30 comprises an Intel-type x86 central processing unit 32 operationally hosting a 32-bit operating system. In its preferred configuration, the server further comprises at least 8 megabits of random access memory (RAM) and a mass storage capacity of at least 500 megabytes, preferably provided in the form of a hard disk drive (neither of which are shown), in order to accommodate the various application program and database portions of the server program architecture.

The server 30 further comprises a network input/output (I/O) port 34 adapted for bi-directional communication between the server 30 and an external, bi-directional telecommunications network 36. In accordance with the invention, and as described in connection with the client device (22 of FIG. 1), the network port 34 preferably comprises 1 Mbps, 10 Mbps or 100 Mbps Ethernet interface adapter circuitry coupled to the network 36 through a 1/10/100 BASE-T I/O and an RJ-45 coax connector. Although the network port 34 is described in the illustrated embodiment of FIG. 2 as comprising an Ethernet interface, it will be immediately recognized by those having skill in the art that the network port 34 is also a "plug replaceable", "black box" element that need only be provided in a form suitable for communicating with client devices over any one of a number of conventionally recognized local or wide-area-network (LAN/WAN) array configurations, or any other of a variety of conventional client-server interconnect topologies.

The server 30 additionally comprises an application architecture, or suite of programs, including a master operating or database engine 38 which carries out all of the response variable processing tasks and is responsible for making a determination as to what action is appropriate in response to a monitoring indication by a client, that one of its supported devices is functioning outside its normal operating parameters. In addition, the database engine 38 maintains information about past actions taken, from a monitoring perspective. For example, if a supported device remains functioning outside its normal operating parameters after its corresponding client has been instructed to change the device's state, the engine provides an appropriate notification message to the responsible user.

Interacting with the database engine 38, is an operational database 40 which comprises all of the information necessary to command any particular piece of supported equipment to perform any particular desired control function. The operational database includes the decision tree architecture necessary to determine what action to take in response to any particular out- of-tolerance response variable (i.e., turn on a fan if the temperature exceeds 80 degrees). The database engine 38 and operational database 40, in combination, can be viewed as a control system, suitably configured as an executable application program that is able to interact with client systems 10 in order to receive monitoring information from the client systems, determine whether fault conditions exist, determine the appropriate action required, and to supply the client systems with the appropriate control response information from the operational database 34.

In accordance with the invention, the server 30 also includes a service database 42 for collecting and storing periodic monitoring and control data provided by various client systems and reported to the server during each client's reporting period. The server stores the polling data in the service database 42 and is able to generate various reports from the stored data for the facilities management system users.

Each of the components of the server application suite is preferably written in the JAVA high-level programming language, such that the application suite is able to interface with any JAVA supported browser application on any PC-type computer system, or web-based device, and use the browser as its primary Graphical-User-Interface (GUI) 44 for communicating with and displaying its information to a system user. The GUI 44 suitably comprises all of the necessary interfaces for displaying status information about the system states and history of all supported power, environmental, security, and health/safety and fire equipment, in a form and format compatible with most browser applications. In addition to being able to display information in a browser format, the operational database 40 is disposed in a format suitable for direct access and displayed by a web-enabled spreadsheet application, preferably such as an Excel 97/98 spreadsheet, manufactured and sold by Microsoft Corporation. Thus, providing the familiar interfaces of a web browser and the Excel 97 spreadsheet program, allows the application suite of the present invention to posses a degree of flexibility and ease of use not currently available in the conventional art.

Further, the server is configured to communicate alert notification information to system users located at ancillary network terminal nodes, via an e-mail application, through its network link port 34 using an IP or TCP/IP packet-based transmission protocol. Using an Internet Protocol-based transmission scheme allows the server to communicate with any remote device, connected to the network, and hosting an IP capable application. Alert notification and visual alarming requires little more that sending a pre-configured alert message to a designated network address (a designated user ID) by e-mail, and following-up with an appropriate alert page message to the designated user's pager number or other equivalent communications interface.

Figure 3:
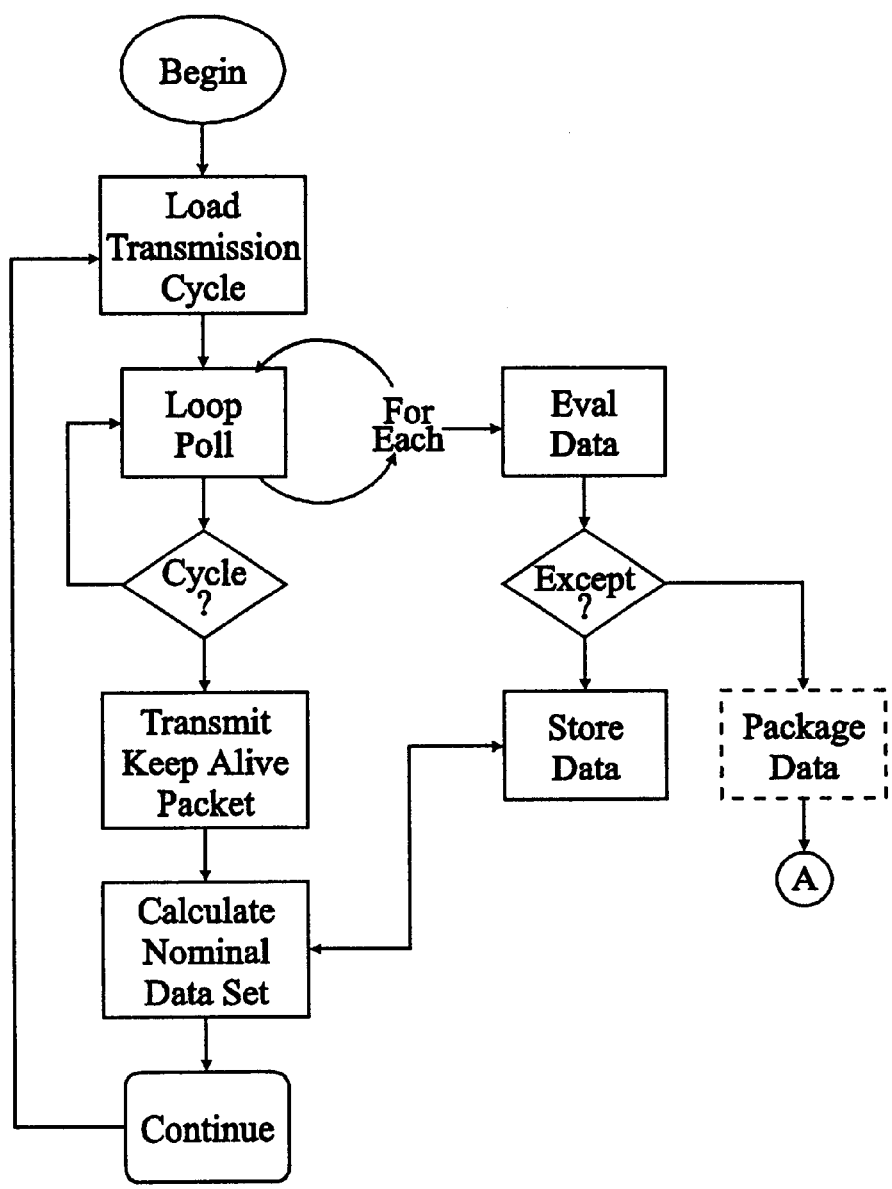
FIG. 3 is a simplified flow diagram illustrating the operating procedure of an exemplary client system.

Turning now to FIG. 3, there is depicted a generalized flow diagram of the operating process of a typical client system in accordance with the present invention. According to standard procedure, the client system polls each piece of facilities equipment to which it is connected, on a periodic basis, the periodicity of which is pre-determined and set in the operating program portion of the client system as a "polling cycle" parameter. The polling cycle defines how often the client system will poll its designated facilities equipment and characteristically depends on how often the supported protocol desires the supported apparatus to be polled. A polling cycle typically occurs approximately once every second, but may be shortened or extended, at the system designer's or user's option, depending on whether or not the response variable for a particular piece of equipment is quickly or slowly-varying. It should also be mentioned that in cases where the supported apparatus does not support polling, i.e., machines adapted to communicate by contact closure, the client system is configured to periodically access the serial bus and listen for a state change. Serial bus access occurs as often as the supported protocol desires to be listened to.

A client to server transmission time frame is also established in the operational sections of the client system and defines a set time period in which the server expects to receive some form of information from each client. This time frame is typically chosen to be approximately once each minute, but may be lengthened or shortened at the discretion of the system designer or user. In the course of normal operations, a "keep alive" transmission packet of information is pushed, from the client to the server at the conclusion of each time period. This "keep alive" information contains only client system state information, and functions to keep the server informed as to whether or not the client is operating normally. At the end of each time frame (transmission cycle), the client system further evaluates the results obtained from its polling activities from all of its polling cycles. A nominal data set is calculated and stored in the client's memory and is retained as historical data defining the monitoring states of the infrastructure equipment monitored by that client device. In particular, each data set might comprise the high, the low and a calculated mean or median value of monitoring responses from a device during that time period. All of the nominal data sets stored by the client are available to a system user, by the user's making an appropriate request for historical data to the server, which, in turn, "fetches" the information from the client. Thus, making historical data readily available on a client, but not routinely "pushed" to the server, results in a significant network bandwidth savings. Bandwidth is only consumed by a large scale data transaction when a system user affirmatively requests such a transfer.

Further, when a particular monitoring value, recorded by a client from a particular infrastructure device, indicates the device is functioning outside its normal operating parameters, the client interrupts normal procedure and transmits all nominal data stored with regard to that value and that device to the server, without regard to the time frame cycle. Once this extra-normal (exception-based) transmission is complete, the client system returns to normal operation and continues operating within its established time frames.

Thus, as indicated in FIG. 3, time frame and polling cycle values are defined for the operating program section of the client and server systems. As a particular time frame initiates, so too does the polling cycle parameter for that particular time frame. The client system executes polling in accordance with the polling rate variable and, for each poll result, evaluates the data returned from each piece of equipment.

It will be seen that summary data can be calculated on an hourly basis, a daily basis, a monthly basis, and the like. All that is required is to merely add exterior loops to the process and define further frame variables having the appropriate count values (hour, day, month, etc.). Typically, this information is maintained in the client system's non-volatile memory where it is available if a system user requests the information from it through the network link via the system server. Nominally, the client system only enters into communication with the server on a once-per-time-frame-cycle basis in order to conserve network bandwidth. Notwithstanding its normal reporting cycle, the client system is able to be accessed by a user, at any time, by the user's making the appropriate information request through the server.

In the exception communication mode, a message is sent from the client system to the server when the client system records a response variable data point that is outside a particular piece of equipment's normal operating parameters. This can occur, for example, when a temperature parameter falls outside of a pre-set range of a thermostat setting, a normally closed security door changes its state to open, a power utility monitor indicates that there is a power outage, and the like. When a client system detects such a condition, it enters exception mode and immediately sends its information about the monitored device's state change or out-of-parameter condition to the server, as indicated in FIG. 3 at A. As will be described in greater detail below, the server system then functions as the central processing and decision making facility for deciding what form of action should be taken, if any, by the client system.

Figure 4:
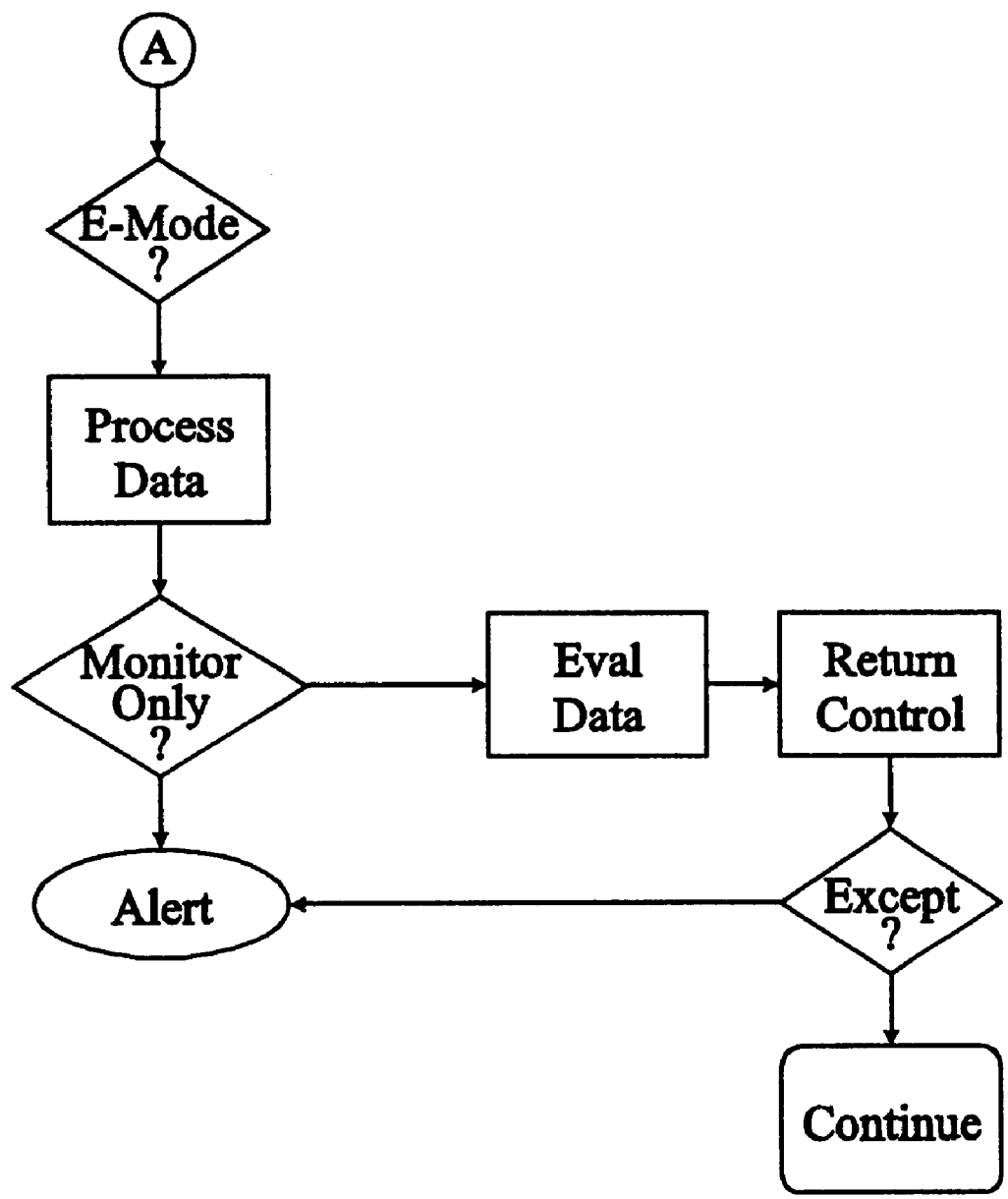
FIG. 4 is a simplified flow diagram illustrating a server-level decision making procedure.

FIG. 4, illustrates an exemplary decision making process that might be undertaken by a server system in accordance with practice of principles of the invention, when a particular client system has indicated that one, or more, of its monitored devices is operating outside of its normal parameters, thus, constituting an exception. If a client device passes a signal to the server which indicates that it is in exception mode, the server processes the information received from the client system and determines whether the out-of-tolerance device is a controllable device or a device that is only monitored. As was described above, the server system is able to access all of the information necessary to change the state of any supportable device and is able to communicate the information required to change the state of the device through the corresponding client system.

When the server is informed of an out-of-tolerance condition by a client device, it invokes the master database engine running in conjunction with the operational database (38 and 40 of FIG. 2) which processes the data and which makes a determination as to what action should be taken. Should a device that is monitored only become out-of-tolerance, the server issues an alert or a notification message to the appropriate party over the server's network interface. Should a controllable device become out-of-tolerance, the server system evaluates the response variable data, makes a determination as to what action the client should take (i.e., turn on the air condition, sound a security alert, turn on a back-up generator, and the like) and returns the appropriate instructions to the appropriate client system to effect the desired action. The client device accesses the appropriate control codes from its vendor code library and communicates the desired action to the supported device in its native language protocol. Should a controllable device continue in an out-of-tolerance state after the appropriate commands are sent to its corresponding client, and the appropriate control codes issued to the device, the server system issues an alert or a notification message to an appropriate party over its network interface.

Figure 5:
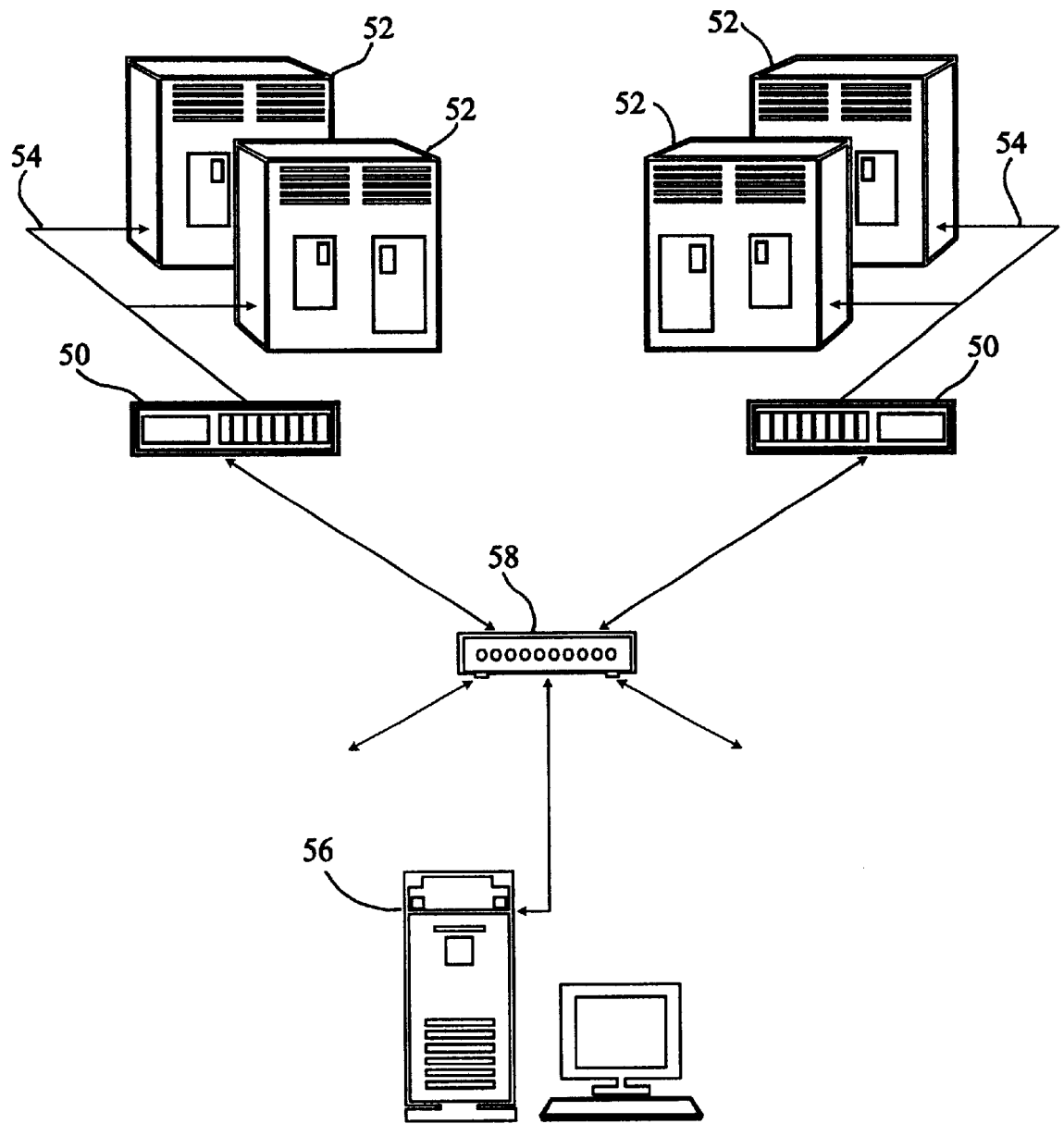
FIG. 5 is a simplified block diagram of a client/server system in accord with the invention, configured as a stand-alone intranet.
Figure 6:
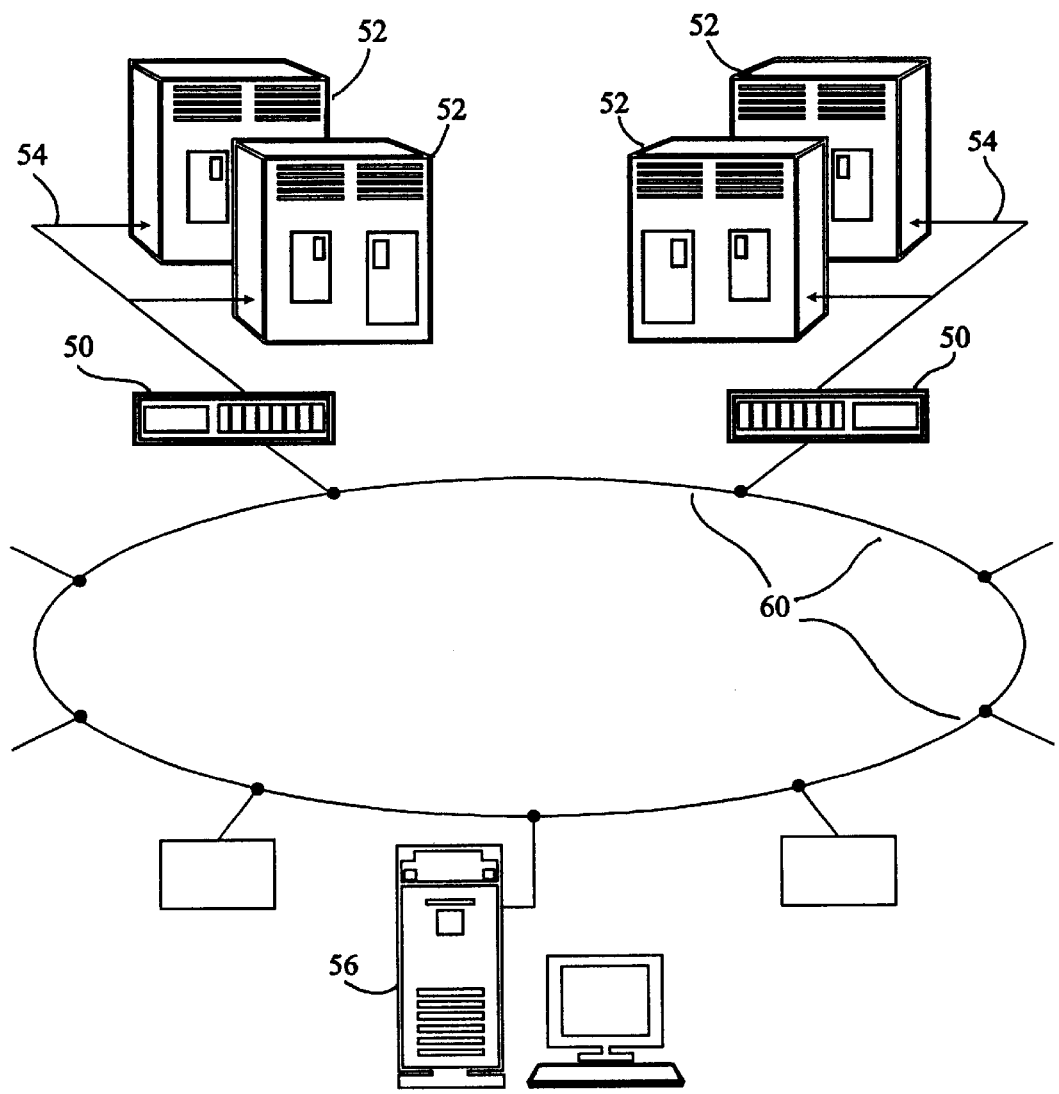
FIG. 6 is a simplified block diagram of a client/server intranet in accord with the invention, configured as an architecture integrated into an existing enterprise-wide network.
Figure 7:
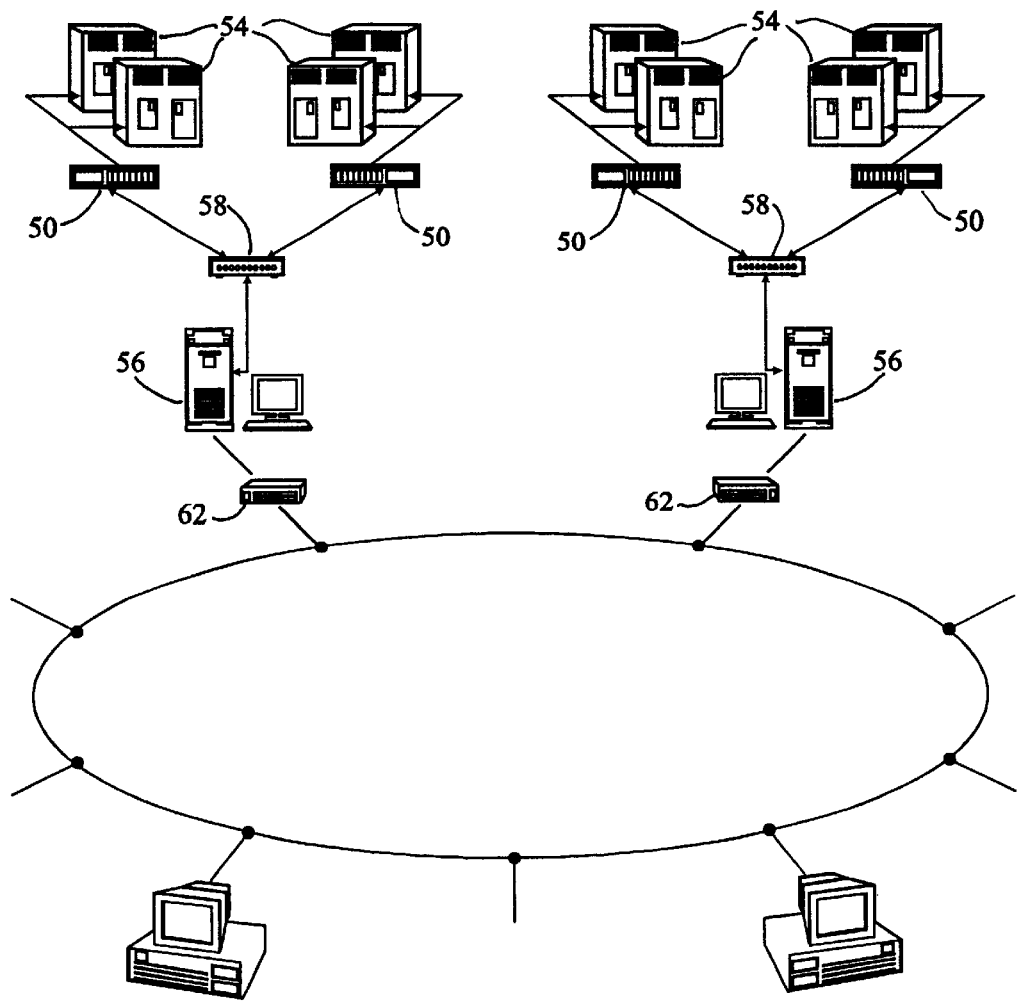
FIG. 7 is a simplified block diagram of a multiplicity of client/server intranets in accord with the invention, each configured as a stand-alone intranet and each intranet integrated into an existing enterprise-wide network.

Exemplary configurations for a facilities management intranet comprising a central monitoring and control server and a multiplicity of client systems, each connected to one or more pieces of facilities equipment, are depicted in semi-schematic form in FIGS. 5, 6 and 7.

In FIG. 5, the exemplary stand-alone management system intranet suitably comprises a number of client systems 50 each coupled to at least one associated piece of infrastructure equipment 52 over a serial communication link 54. The client systems 50 are connected to a central management and control server 56 through a dedicated network hub 58. The network hub 58 enables IP-based communication between the server 56 and the multiplicity of client devices 50 using the hub 58 as a central network nexus. As client devices are added to the intranet, their network I/O ports are coupled into the hub 58, thus allowing the system to expand.

Communication between the central server 56 and a system user connected to an enterprise-wide or corporate-wide network, is made through a modem, connected to the server, which communicates with an Internet Service Provider (ISP) for effecting e-mail and paging for alert notification and the like. ISP connection may be either wireless or by conventional wire-line connections.

Turning now to FIG. 6, there is depicted an exemplary integrated network installation which allows the facilities management intranet system to be integrated into an existing network architecture, such as an enterprise-wide or building-wide data or telecommunications backbone structure. Each of a multiplicity of client systems 50 are again connected to one or more pieces of facilities infrastructure equipment 52 by a serial communication link 54. The client systems 50 and the server system 56 are each coupled to and installed as an integrated component of an existing network structure 60. Each client device and server are simply connected to the closest network jack, thus allowing the existing network infrastructure to serve as the backbone for all transmissions between server and clients.

FIG. 7 depicts an exemplary hybrid network installation, in which a plurality of clients 50 are network-coupled to their associated servers 56 through a central network nexus such as a dedicated hub 58, in a stand-alone configuration similar to that of the exemplary embodiment of FIG. 5. The network server 56 is coupled to an enterprise-wide or building-wide data or telecommunications network through a network switch or gateway, making the system server available to corporate network users, and providing a means for the server to provide alert notifications to designated users in the event a particular piece of infrastructure equipment functioning outside of its normal operating parameters. It should be noted that in the hybrid network configuration, a multiplicity of stand-alone facilities intranets may be coupled into a corporate network by having each of their servers 56 communicate with the corporate network through a network switch or gateway.

A facilities intranet has been described in which a multiplicity of client systems are configured to communicate with one or more pieces of supported facilities infrastructure equipment according to each piece of equipment's native language protocol. Client systems communicate with each supported piece of infrastructure equipment over a serial communication link that is specific to each supported device. In addition, client systems are connected to a management and control server via a network connection and communicate with the server using an IP packet-based transmission protocol. Thus, routine monitoring and control of facilities equipment are carried out locally, over a dedicated serial bus, such that network bandwidth is conserved and only used for periodic transmissions between client devices and their associated server.

Although the present invention has been described with certain exemplary embodiments, it should be understood by those having skill in the art that various changes, substitutions and alterations can be made without departing from the spirit and scope of the present invention. In particular, the data processing and display function of the server system need not be implemented by a browser application, but may instead be implemented by any program that accesses, processes and displays data with or without user intervention. Further, the I/O links between client and supported device and client and server need not be serial or Ethernet-based as described above. Instead, the client supported device link may conform to any physical connection and transmission protocol devised by any particular vendor for implementation in any particular piece of infrastructure equipment. Further, the client to server communication link may be implemented in any form suitable for an enterprise-wide communications network. All that is required, is that the client be able to communicate with a supported device in its native language protocol over a communications link separate from the communications link between the client and server.

Thus, it will be understood that the present invention is not limited to the precise details and exemplary embodiments disclosed, and various changes may be made to the exemplary embodiments without departing from the spirit of the invention which is defined by the following claims.

What is claimed is:

1. A system, comprising:

a standards-based network;

a facilities-type infrastructure device capable of generating and receiving I/O information over a communication interface;

a programmable client device for monitoring and controlling the infrastructure device, the client device being coupled to the infrastructure device by a first communication link matching the communication interface of the infrastructure device and coupled to the network by a network interface, wherein all rules for monitoring and controlling each infrastructure device coupled to the client device are programmed and operational on the client device; and a server coupled to the client by the network, the server operational to provide alarm and viewing management services for the client, wherein the server is operable to provide over the network, and the client is operable to receive, all rules required by the client for monitoring and automatically controlling in the event of a change in operating condition each infrastructure device coupled to the client.

2. The system according to claim 1, wherein the infrastructure device generates and receives I/O information in accordance with a vendor defined native language protocol, the client device recognizing the native language protocol and effecting all bi-directional communication with the infrastructure device in the native language protocol.

3. The system according to claim 2, wherein the network interface link is an Ethernet interface.

4. The system according to claim 3, wherein bi-directional communication between the server and the client device is in accordance with an Internet Protocol packet-based transmission protocol.

5. The system according to claim 4, comprising software supplied to the client device, the software for gathering, on the client machine, monitoring information from the infrastructure device, and for reporting the gathered management information to the server on a periodic basis.

6. The system according to claim 5, wherein the server comprises Web browser accessible software for supporting viewing management services for the client device, the server further comprising software, associated with the Web browser accessible software, for processing monitoring information gathered from the client device, the server providing operating instructions to the client device in response thereto.

7. The system of claim 1, wherein:

the server is operable to receive a monitoring indication from the client device that the infrastructure device is operating outside normal operating parameters and to determine in accordance with the rules for controlling that device an action to take in response to the monitoring indication to appropriately adjust the operating condition of the device.

8. The system of claim 7, wherein:

the server comprises an operational database defining a decision tree specifying what action the server is to take in response to any particular out-of-tolerance condition indicated by any client device.

9. The system of claim 7, wherein the server is operable to send a notification message to a human user in response to the monitoring indication.

10. The system according to claim 1, wherein the client device is coupled to the facilities-type infrastructure device over a serial communication interface.

11. The system according to claim 10, wherein the serial communication interface is selected from the group consisting of RS-232, RS-422, RS-485 and contact closure harnessing communication interfaces.

12. The system of claim 1, wherein: the client device generates an exception signal and transmits it to the server over the network in the event the infrastructure device become out of tolerance; and the server responds to the exception signal by determining whether the infrastructure device is a controllable device and, if so, determining in accordance with the rules for controlling that device what responsive action to take, and then communicating that responsive action to the client device to be performed by the client device.

13. The system of claim 12, wherein:

the client device receives the responsive action and obtains one or more responsive control codes appropriate to perform the responsive action on the infrastructure device from a library of codes, the responsive control codes being control codes native to the infrastructure device; and the client device communicates the responsive control codes to infrastructure device in a native language protocol of the infrastructure device.

14. The system of claim 1, wherein the infrastructure device communicates over the communication interface in accordance with a native language protocol, and wherein the client device has programming comprising:

data and executable instructions defining an operating section; and a library of equipment protocol codes accessible to the operating section to enable the client device to communicate with each respective infrastructure device coupled to the client device using a protocol code native to the respective infrastructure device.

15. The system of claim 1, wherein the client is operable to perform all routine management tasks for the infrastructure device locally.

16. The system of claim 1, wherein the client device is placed in local proximity to the infrastructure device.

17. The system of claim 1, wherein the client device is disposed within the infrastructure device.

18. The system of claim 1, wherein:

the client device is operable to be added to the network and, upon being added to the network, to inform the server of characteristics of every infrastructure device that the client device will manage.

19. The system of claim 1, wherein:

the infrastructure device is selected from the group consisting of power distribution equipment, environmental control equipment, security monitoring equipment and health/safety and fire equipment; and the network supports a TCP/IP packet-based information transmission protocol.

20. The system of claim 1, wherein:

a time period is established in which the server expects periodically to receive some form of information from the client device; and the client device, in the course of normal operations, pushes a "keep alive" packet to the server within each time period, the packet containing information indicating to the server whether or not the client device is operating normally.

21. A method for providing monitoring and control for facilities equipment distributed over multiple sites interconnected with a pre-existing standards-based network, the method comprising:

providing multiple client devices and coupling each client device to a pre-existing standards-based network by a network interface;

assigning one of the multiple client devices to each one of multiple facilities-type infrastructure devices, the multiple infrastructure devices being distributed over multiple sites interconnected by the pre-existing standards-based network, each client device being physically local to all of the infrastructure devices to which the client device is assigned;

wherein each infrastructure device is capable of generating information and receiving instructions over a communication interface and each client device is configured for monitoring and controlling the infrastructure devices assigned the client device, each client device being coupled to each assigned infrastructure device by a communication link matching the communication interface of the corresponding assigned infrastructure device; and providing a server coupled to the client devices by the network, the server operational to provide alarm and viewing management services for the client devices, the server further providing initial setup parameters and continuing operating instructions to the client devices, wherein the server is operable to provide over the network, and the client devices are operable to receive and carry out, all rules required by the client devices for monitoring and automatically controlling in the event of a change in operating condition their respective assigned infrastructure devices.

22. The method of claim 21, wherein:

the server is operable to provide over the network, and each client device is operable to receive over the network, all rules required by each client device for monitoring and controlling each infrastructure device assigned to the client device;

each infrastructure device is assigned to exactly one client device; and each client device is placed in local proximity to all the infrastructure devices to which the client device is assigned.

* * * * *